A. Horn.
Ore Amalgamator.
N°80,739.  Patented Aug. 4, 1868.

WITNESSES:
Geo. H. Strong
J. L. Boone

INVENTOR:
Alfred Horn
by his Atty.
Dewey &

United States Patent Office.

ALFRED HORN, OF SILVER CITY, NEVADA.

Letters Patent No. 80,789, dated August 4, 1868.

IMPROVED AMALGAMATOR.

The Schedule referred to in these Letters Patent and making part of the same.

TO ALL WHOM IT MAY CONCERN:

Be it known that I, ALFRED HORN, of Silver City, county of Lyon, State of Nevada, have invented an Improved Grinder and Amalgamator; and I do hereby declare the following description and accompanying drawings are sufficient to enable any person skilled in the art or science to which it most nearly appertains to make and use my said invention or improvements without further invention or experiment.

My invention relates to an improved grinding and amalgamating-pan, for extracting the precious metals, and consists in forming annular grooves around the inner periphery of the pan and the axis of revolution, and connecting the two by a channel or channels beneath the dies; also, to incline projections cast upon the ends of the shoes, so as to take up the mercury, in rotating in the grooves or channels, and distribute it through the pulp, and at the same time conform to the natural wear of the shoes and dies without adjustment.

My invention also relates to the manner of attaching rings to the sides or rim of the pan.

Referring to the drawings, forming a part of this specification—

Figure 2:
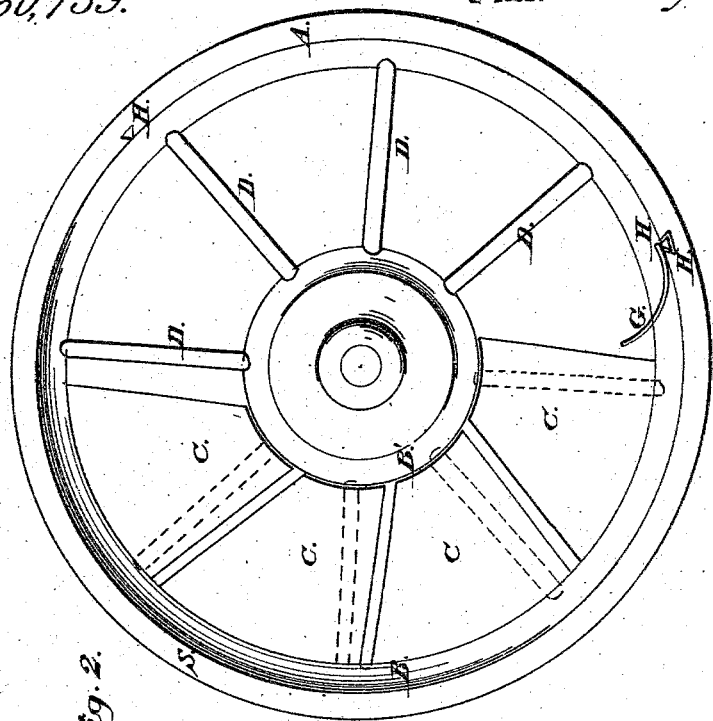
Figure 2 is a plan of the bottom of the pan.
Figure 3:
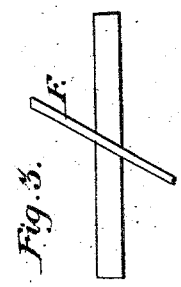
Figure 3 shows a view of the shoe.
Figure 1:
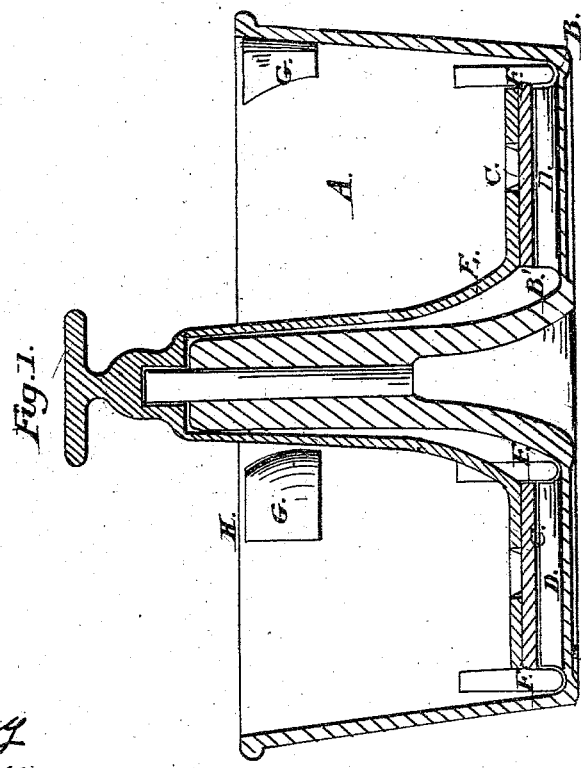
Figure 1 is a side sectional elevation.

A represents a pan, constructed of iron, of any desired size, having a conical centre, around which the muller rotates. Around the inner periphery of the bottom of the pan is made an annular channel or groove, B, and a channel, B', around the conical centre, at its base, which may be made a little wider than that of B. Between these two grooves the surface of the pan is a plane, and upon it are placed the dies C C C C. Beneath the dies, in the bottom of the pan, are also made channels or grooves D D, which connect with the inner and outer grooves, which allow the mercury to pass from one to the other.

The muller-frame E revolves around the conical centre of the pan in the usual way, and extends to near the sides of it, less the width of the outer groove and dip of the pan.

To the outer ends of the mullers or shoes are cast incline scrapers F F, the lower ends of which fit the concavity of the annular groove, and conform to the wear of the shoes and dies without adjustment other than that usually employed for raising and lowering the mullers. The inner end of one or more of the shoes may be provided with my adjustable scrapers, which were fully described in a patent granted to me for an improved amalgamator, dated November 19, 1867.

The operation of my grinder and amalgamator is as follows: Quicksilver is placed in the channels B and B', and the pan filled with pulp, when the mullers are set in motion. The incline projections at the end of the shoes, following the circular path of the grooves, take up the quicksilver and distribute it through the pulp, causing a more thorough incorporation with the mass than where it is allowed to remain dormant in the annular channels, while the openings in the bottom of the pan permit a free communication between the two by weight of the pulp or grinders, or gravity of the quicksilver, as in case where a larger body accumulates in the central groove.

For arresting and breaking the rotary current of the pulp towards the rim of the pan, ordinary curved wings, G G G, are attached by a bevelled vertical slot, H, with a corresponding lug, H', to fit the opening, thus dove-tailing the wing to the pan, and allowing it to be easily removed. This opening is cast with the pan, and the lug cast with the ring.

Having thus described my invention, what I claim, and desire to secure by Letters Patent, is—

1. In combination with the annular chambers B and B', the connecting-groove or grooves D D, substantially as and for the purpose specified.

2. The incline projection or scrapers F F, cast at the end of the shoe, conforming to the natural wear of the shoes and dies without adjustment, substantially as described.

3. Attaching the wings G G by the bevelled slots H H and lugs H' H', substantially as described.

In witness whereof, I have hereunto set my hand and seal.

ALFRED HORN. [L. S.]

Witnesses:
C. W. M. SMITH,
J. L. BOONE.